US011677918B2

United States Patent
Cho et al.

(10) Patent No.: US 11,677,918 B2
(45) Date of Patent: Jun. 13, 2023

(54) METHOD AND APPARATUS FOR COLOR SPACE CONVERSION

(71) Applicant: SAMSUNG ELECTRONICS CO., LTD., Suwon-si (KR)

(72) Inventors: Sung Kwang Cho, Seoul (KR); Yang Ho Cho, Seongnam-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 17/380,896

(22) Filed: Jul. 20, 2021

(65) Prior Publication Data

US 2022/0182590 A1   Jun. 9, 2022

(30) Foreign Application Priority Data

Dec. 3, 2020 (KR) .................. 10-2020-0167286

(51) Int. Cl.
*H04N 9/67* (2023.01)
*G06T 7/90* (2017.01)
(Continued)

(52) U.S. Cl.
CPC ............. *H04N 9/67* (2013.01); *G06N 3/08* (2013.01); *G06T 7/90* (2017.01); *H04N 23/80* (2023.01);
(Continued)

(58) Field of Classification Search
None
See application file for complete search history.

(56) References Cited

U.S. PATENT DOCUMENTS

| 7,773,127 | B2 | 8/2010 | Zimmer et al. |
| 9,042,674 | B2 * | 5/2015 | Padwick .................. G06T 7/30 |
| | | | 382/284 |

(Continued)

FOREIGN PATENT DOCUMENTS

| JP | 1169177 A | 3/1999 |
| JP | 2003085555 A | 3/2003 |

(Continued)

OTHER PUBLICATIONS

Jin, X., et al., "Deep Image Aesthetics Classification using Inception Modules and Fine-tuning Connected Layer", arXiv:1610.02256v1 [cs.CV], Oct. 7, 2016, 6 pages.

(Continued)

*Primary Examiner* — James M Hannett
(74) *Attorney, Agent, or Firm* — Sughrue Mion, PLLC

(57) ABSTRACT

A method and apparatus for color space conversion are provided. An apparatus for converting a color space includes at least one processor configured to convert an original full image of an original color space to a temporary image of a target color space, estimate a color space mapping parameter between the original color space and the target color space, the color space mapping parameter corresponding to the original full image, obtain a residual vector of the target color space based on the temporary image and the color space mapping parameter, convert the residual vector to a residual image of the target color space, and obtain a target full image of the target color space by combining the residual image with the temporary image.

14 Claims, 6 Drawing Sheets

(51) Int. Cl.
  *G06N 3/08* (2023.01)
  *H04N 23/80* (2023.01)
  *H04N 23/84* (2023.01)
(52) U.S. Cl.
  CPC .  *H04N 23/843* (2023.01); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 9,219,870 B1* | 12/2015 | Mills | H04N 9/07 |
| 9,860,516 B2* | 1/2018 | Shibazaki | H04N 5/232122 |
| 2003/0206307 A1 | 11/2003 | Handley et al. | |
| 2008/0075394 A1* | 3/2008 | Huang | H04N 9/04515 382/300 |
| 2008/0088857 A1 | 4/2008 | Zimmer et al. | |
| 2012/0200870 A1 | 8/2012 | Shiohara | |
| 2013/0279802 A1 | 10/2013 | van der Merwe | |
| 2020/0211229 A1* | 7/2020 | Hwang | G06T 3/4046 |
| 2020/0234044 A1* | 7/2020 | Cai | G06K 9/6262 |
| 2021/0390747 A1* | 12/2021 | Feng | G06T 11/60 |

FOREIGN PATENT DOCUMENTS

| | | |
|---|---|---|
| JP | 2013115679 A | 6/2013 |
| JP | 2017187954 A | 10/2017 |
| KR | 1020070118756 A | 12/2007 |
| KR | 1020080065447 A | 7/2008 |
| KR | 101947097 B1 | 2/2019 |

OTHER PUBLICATIONS

Gunturk, B., et al., "Demosaicking: Color Filter Array Interpolation", IEEE Signal Processing Magazine, Jan. 2005, pp. 44-54.
"Color", https://en.wikipedia.org/wiki/Color_difference#CIEDE2000, CIEDE2000, 2021, 4 pages.
"Neural Networks and Introduction to Deep Learning", WikiStat, pp. 1-17.

* cited by examiner

METHOD AND APPARATUS FOR COLOR SPACE CONVERSION

CROSS-REFERENCE TO RELATED APPLICATION

This application is based on and claims priority under Korean Patent Application No. 10-2020-0167286, filed on Dec. 3, 2020, in the Korean Intellectual Property Office, the disclosure of which is incorporated by reference herein in its entirety.

BACKGROUND

1. Field

Methods and apparatuses consistent with example embodiments relate to methods and apparatuses for converting a color space of an image, and more particularly, to methods and apparatuses for converting a color space of an image through a neural network.

2. Description of the Related Art

In technology for converting a color space using a transformation matrix, a transformation matrix is applied by assuming color spaces have a linear mapping. According to this technology, it is possible to convert a color space of an image simply and quickly through a transformation matrix. However, a mapping relationship between color spaces includes nonlinear characteristics, and according to this technology, a transformation matrix is not suitable for such nonlinear characteristics, and thus the accuracy of the color space conversion may decrease.

The above description has been possessed or acquired by the inventor(s) in the course of conceiving the present disclosure and is not necessarily an art publicly known before the present application is filed.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

In accordance with an aspect of an example embodiment, there is provided a method of converting a color space includes converting an original full image of an original color space to a temporary image of a target color space; estimating a color space mapping parameter between the original color space and the target color space, the color space mapping parameter corresponding to the original full image; obtaining a residual vector of the target color space based on the temporary image and the color space mapping parameter; converting the residual vector to a residual image of the target color space; and obtaining a target full image of the target color space by combining the residual image with the temporary image.

The obtaining the residual vector may include converting the temporary image to a first vector using a first main layer of a neural network; obtaining a second vector based on the first vector and the color space mapping parameter; converting the second vector to a third vector using a second main layer of the neural network; and obtaining the residual vector based on the third vector and the color space mapping parameter.

The obtaining of the residual vector based on the third vector and the color space mapping parameter may include obtaining a fourth vector based on the third vector and the color space mapping parameter; and converting the fourth vector to the residual vector using a third main layer of the neural network.

The original color space may include a cyan, magenta, yellow, and green (CMYG) color space, and the target color space may include a red, green, and blue (RGB) color space.

The converting to the temporary image may include converting the original full image to the temporary image using one or more pre layers of a neural network, the estimating of the color space mapping parameter may include estimating the color space mapping parameter from the original full image using one or more attention layers of the neural network, the obtaining of the residual vector may include obtaining the residual vector based on the temporary image and the color space mapping parameter using two or more main layers of the neural network, the converting to the residual image may include converting the residual vector to the residual image using a post layer of the neural network, and the one or more pre layers, the one or more attention layers, the two or more main layers, and the post layer may be trained based on training data.

In accordance with an example embodiment, there is provided a method of converting a color space includes obtaining a preprocessed mosaic pattern image by performing image signal preprocessing on an original mosaic pattern image of an original color space; obtaining an original full image of the original color space by demosaicing the preprocessed mosaic pattern image; obtaining a target full image of a target color space based on a residual image and based on a color space mapping parameter between the original color space and the target color space, the color space mapping parameter corresponding to the original full image; and obtaining a target mosaic pattern image of the target color space by performing downsampling on the target full image.

The obtaining of the target full image may include converting the original full image of the original color space to a temporary image of the target color space; estimating the color space mapping parameter between the original color space and the target color space, the color space mapping parameter corresponding to the original full image; obtaining a residual vector of the target color space based on the temporary image and the color space mapping parameter; converting the residual vector to the residual image of the target color space; and obtaining the target full image of the target color space by combining the residual image with the temporary image.

The obtaining the residual vector may include converting the temporary image to a first vector using a first main layer of a neural network; obtaining a second vector based on the first vector and the color space mapping parameter; converting the second vector to a third vector using a second main layer of the neural network; and obtaining the residual vector based on the third vector and the color space mapping parameter.

The obtaining of the residual vector based on the third vector and the color space mapping parameter may include obtaining a fourth vector based on the third vector and the color space mapping parameter; and converting the fourth vector to the residual vector using a third main layer of the neural network.

The original color space may include a CMYG color space, and the target color space may include an RGB color space.

The converting to the temporary image may include converting the original full image to the temporary image using one or more pre layers of a neural network, the estimating of the color space mapping parameter may include estimating the color space mapping parameter from the original full image using one or more attention layers of the neural network, the obtaining of the residual vector may include obtaining the residual vector based on the temporary image and the color space mapping parameter using two or more main layers of the neural network, the converting to the residual image may include converting the residual vector to the residual image using a post layer of the neural network, and the one or more pre layers, the one or more attention layers, the two or more main layers, and the post layer may be trained based on training data.

A non-transitory computer-readable storage medium may store instructions that, when executed by a processor, cause the processor to perform the method of an above-noted aspect of the disclosure.

In accordance with an aspect of an example embodiment, there is provided an apparatus for converting a color space includes at least one processor configured to convert an original full image of an original color space to a temporary image of a target color space, estimate a color space mapping parameter between the original color space and the target color space, the color space mapping parameter corresponding to the original full image, obtain a residual vector of the target color space based on the temporary image and the color space mapping parameter, convert the residual vector to a residual image of the target color space, and obtain a target full image of the target color space by combining the residual image with the temporary image.

In accordance with an aspect of the disclosure, a terminal includes at least one processor; and an image sensor configured to obtain an original mosaic pattern image of an original color space, wherein the processor is configured to obtain a preprocessed mosaic pattern image by performing image signal preprocessing on the original mosaic pattern image, obtain an original full image of the original color space by demosaicing the preprocessed mosaic pattern image, obtain a target full image of a target color space based on a residual image and based on a color space mapping parameter between the original color space and the target color space, the color space mapping parameter corresponding to the original full image, and obtain a target mosaic pattern image of the target color space by performing downsampling on the target full image.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
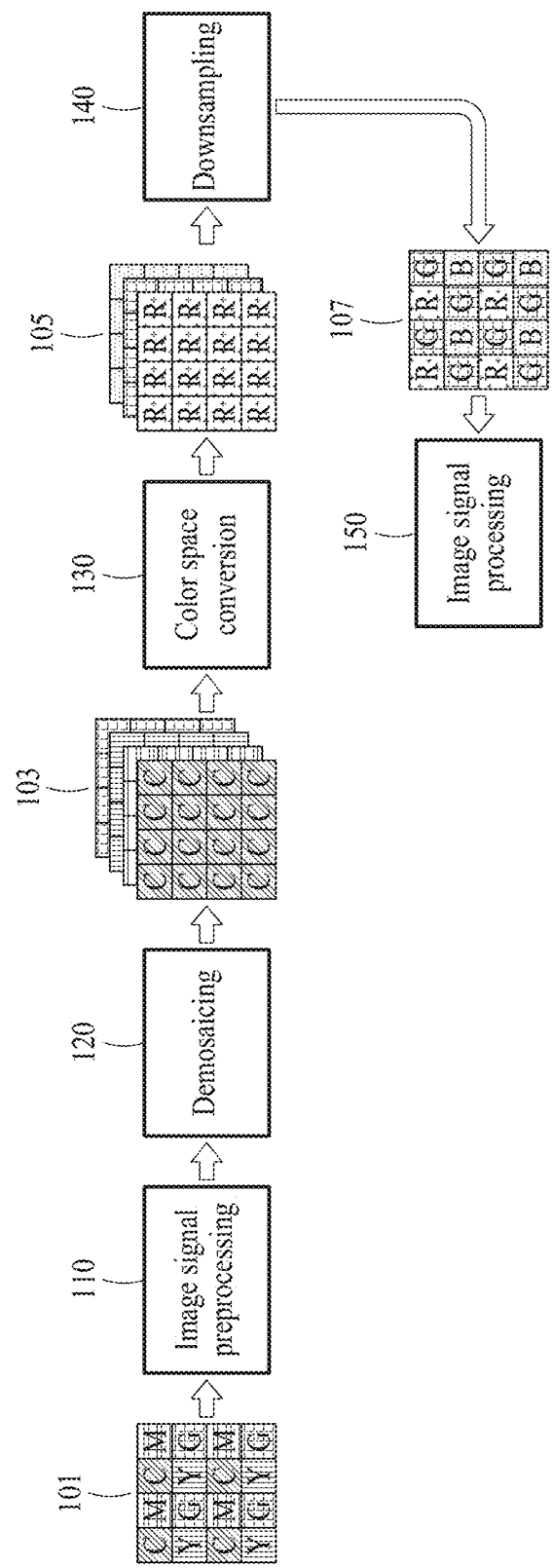
FIG. 1 is a flowchart illustrating the entire process of a color space converting method of a mosaic pattern image level according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a flowchart illustrating the entire process of a color space converting method of a mosaic pattern image level according to an example embodiment.

In general, a digital camera is provided with an image sensor having an array of color filters. The digital camera may include a digital device including an image sensor, such as, for example, a video camera or a digital still camera.

The image sensor includes multiple pixels (e.g., color pixels having a color value of any one of red (R), green (G), and blue (B)) arranged in a two-dimensional array, and a color filter array (CFA) formed above the pixels to generate a color image.

The CFA may be configured in various CFA patterns. The CFA patterns may also be referred to as mosaic patterns. For example, a mosaic pattern applied to the CFA may include a Bayer pattern that is generally applied to an image sensor.

For example, the Bayer pattern may provide each pixel with a high-sensitivity optical response to one of three wavelengths (e.g., red (R), green (G), and blue (B)) of the visible spectrum. A unit Bayer pattern of a red green blue (RGB) color space includes 2×2 pixels, where green filters are applied to two pixels that diagonally face each other, and a red filter and a blue filter are applied to the other two pixels, respectively. Since green transmits most of the luminance information to humans, there are twice as many of the green filters as the red filter or the blue filter.

In an image captured using an image sensor to which a mosaic pattern is applied, each pixel has one color. The image sensor may output only information about one color from one pixel. Hereinafter, an image that is captured using an image sensor to which a mosaic pattern is applied and thus, has one color for each pixel may be referred to as a mosaic pattern image. However, the colors of an image provided to humans are expressed by combining monochrome values. Here, a full-color image generated by combining monochrome values may be referred to as a full image or a full-color image.

For example, in an RGB color space, a full image may be generated through a combination of red (R), green (G), and blue (B). Each pixel represents one color value among red (R), green (G), and blue (B), and the remaining two colors may be calculated from the color values of neighboring pixels. Here, the process of deriving a full image from a mosaic pattern image may be referred to as demosaicing. For example, in the RGB color space, a Bayer pattern image may have only a color value of one channel for each pixel, and may be converted into a full image having color values of all channels (full RGB values) for each pixel through demosaicing.

To generate the full image, the color values not present in each pixel may be calculated through interpolation of the color values of neighboring pixels. However, this is only an example, and demosaicing may include various techniques such as bilinear interpolation, median filtering, vector CFA, gradient-based modeling, and statistical modeling.

Recently, pixels constituting an image sensor have been miniaturized. The miniaturized pixels may have issues of a reduced amount of light received and increased noise. In order to increase the amount of light received by the sensor and reduce noise, a color filter array of a cyan, magenta, yellow, and green (CMYG) color space may be used instead of a color filter array of an RGB color space.

Since the colors of the CMYG color space are in a complementary color relationship, a color filter array of the CMYG color space may receive about two times more light throughout all the wavelengths than a color filter array of the RGB color space. An image sensor to which the color filter array of the CMYG color space is applied may be robust against noise.

An image signal processor (ISP) of a typical camera receives an RGB Bayer pattern image. However, the image sensor to which the color filter array of the CMYG color space is applied outputs a CMYG Bayer pattern image. Thus, to apply the image sensor to a typical camera, the CMYG Bayer pattern image needs to be converted to an RGB Bayer pattern image.

According to an example, a color space converting apparatus may convert a CMYG Bayer pattern image 101 to an RGB Bayer pattern image 107. To this end, the color space converting apparatus may convert the CMYG Bayer pattern image 101 to a CMYG full image 103, convert the CMYG full image 103 to an RGB full image 105, and convert the RGB full image 105 to the RGB Bayer pattern image 107.

The color space converting apparatus may perform image signal preprocessing 110 on the CMYG Bayer pattern image 101. Image signal preprocessing 110 may include bad pixel correction (BPC), lens shading correction (LSC), and denoising.

The color space converting apparatus may obtain the CMYG full image 103 by demosaicing 120 the result of image signal preprocessing 110. For example, each pixel in the preprocessed CMYG Bayer pattern image may correspond to one of cyan, magenta, yellow, and green. The color space converting apparatus may interpolate the color values of pixels neighboring each pixel to assign a full-color value including cyan, magenta, yellow, and green to each pixel.

The color space converting apparatus may convert the CMYG full image 103 to the RGB full image 105 through color space conversion 130. Color space conversion 130 may be referred to as color conversion. The color space converting apparatus may perform color space conversion using a neural network including various layers. The neural network used for color space conversion 130 may be trained in advance through training data so as to accurately perform color space conversion.

For color space conversion 130, the color space converting apparatus may convert an original full image of an original color space to a temporary image of a target color space. The original color space refers to a color space before color space conversion 130 is performed, and the target color space refers to a color space after color space conversion 130 is performed. The original full image refers to a full image before color space conversion 130 is performed. The target full image refers to a full image after color space conversion 130 is performed. The temporary image refers to an image of a temporary target color space, converted from the original full image of the original color space. The temporary image may be a rough image, and the temporary image may be further adjusted using a sophisticated residual image to obtain the highly accurate target full image.

For example, referring to FIG. 1, the original color space may be a CMYG color space, and the target color space may be an RGB color space. The original full image may be the CMYG full image 103, and the target full image may be the RGB full image 105.

The color space converting apparatus may estimate a color space mapping parameter between the original color space and the target color space, corresponding to the original full image. In other words, the estimated color space mapping parameter may correspond to the original full image and may map the original color space of the original full image to the target color space of the target full image. A mapping relationship between different color spaces may be nonlinear, and a different mapping relationship may correspond to each relationship between different color spaces. The color space converting apparatus may receive each pixel of the original full image and estimate a color space mapping parameter between the original color space and the target color space, corresponding to the pixel. The mapping parameter refers to a parameter that controls the mapping relationship between the original color space and the target color space for each position.

The color space converting apparatus may obtain a residual vector of the target color space based on the temporary image and the color space mapping parameter. The residual vector is an element used to adjust the temporary image to derive more accurate results. The temporary image may correspond to a great value forming the final result (i.e., a large portion of the final result), and the residual vector may correspond to a small value (i.e., a small portion of the final result). By processing the residual vector corresponding to a small value, parameters of the neural network may be trained more accurately and stably.

The color space converting apparatus may convert the residual vector to the residual image of the target color space. The residual vector may have a dimension suitable to be processed by the neural network, and the residual image may have a dimension of the target color space.

The color space converting apparatus may output the target full image of the target color space by combining the residual image with the temporary image. The color space converting apparatus may combine the temporary image having a rough shape of the target full image with the residual image corresponding to the sophisticatedly adjusted value, thereby outputting the target full image as an accurate result.

The color space converting apparatus may obtain the RGB Bayer pattern image 107 by downsampling the RGB full image 105. Each pixel in the RGB full image 105 corresponds to color values of all channels, whereas each pixel in the RGB Bayer pattern image 107 may correspond to a color value of only one channel.

The color space converting apparatus may perform image signal processing (ISP) 150 on the RGB Bayer pattern image 107. Image signal processing 150 may include various processing, such as black level adjustment, noise reduction, white balance, color filter array interpolation, color correction, and gamma correction, edge enhancement, contrast enhancement, and color enhancement.

As described above, the color space converting apparatus may reduce noise in a raw image by using a color filter array of a color space having a high light-receiving capability. The color space converting apparatus may convert an image of a predetermined color space to an image of another color space, thereby increasing the compatibility in image signal processing specialized for the image of the other color space.

Figure 2:
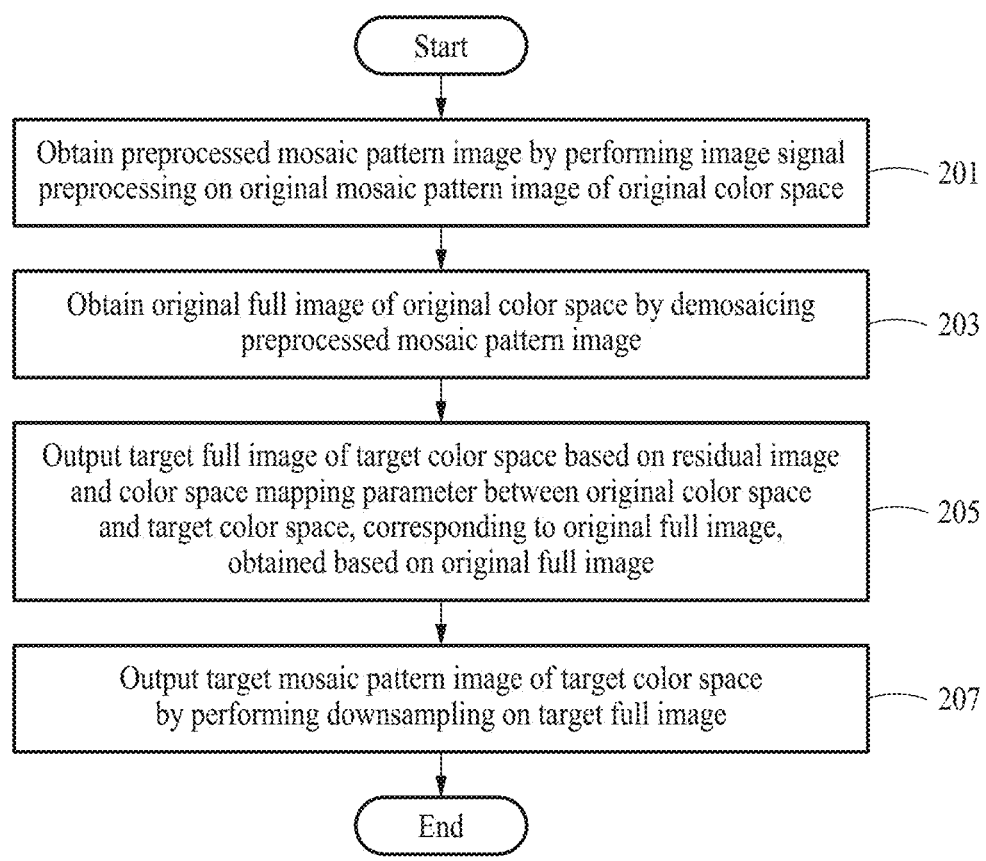
FIG. 2 is a flowchart illustrating operations of a color space converting method of a mosaic pattern image level according to an example embodiment.

FIG. 2 is a flowchart illustrating operations of a color space converting method of a mosaic pattern image level according to an example embodiment.

Referring to FIG. 2, operations of a color space converting method of a mosaic pattern image level are disclosed.

In operation 201, a color space converting apparatus may obtain a preprocessed mosaic pattern image by performing image signal preprocessing on an original mosaic pattern image of an original color space.

In operation 203, the color space converting apparatus may obtain an original full image of the original color space by demosaicing the preprocessed mosaic pattern image.

In operation 205, the color space converting apparatus may obtain and output a target full image of a target color space based on a residual image and a color space mapping parameter between the original color space and the target color space, the color space mapping parameter corresponding to the original full image.

The color space converting apparatus may convert the original full image of the original color space to a temporary image of the target color space. The color space converting apparatus may convert the original full image to the temporary image using one or more pre layers of a neural network. The color space converting apparatus may estimate the color space mapping parameter between the original color space and the target color space, corresponding to the original full image. The color space converting apparatus may estimate the color space mapping parameter from the original full image using one or more attention layers of the neural network. The color space converting apparatus may obtain a residual vector of the target color space based on the temporary image and the color space mapping parameter. The color space converting apparatus may obtain the residual vector based on the temporary image and the color space mapping parameter using two or more main layers of the neural network.

The color space converting apparatus may convert the temporary image to a first vector using a first main layer of a neural network. The color space converting apparatus may output a second vector based on the first vector and the color space mapping parameter. The color space converting apparatus may convert the second vector to a third vector using a second main layer of the neural network. The color space converting apparatus may output the residual vector based on the third vector and the color space mapping parameter.

In addition, the color space converting apparatus may output a fourth vector based on the third vector and the color space mapping parameter. The color space converting apparatus may convert the fourth vector to the residual vector using a third main layer of the neural network. The number of main layers is an example, and two or more main layers may be used.

The color space converting apparatus may convert the residual vector to the residual image of the target color space. The color space converting apparatus may convert the residual vector to the residual image using a post layer of the neural network.

The color space converting apparatus may output a target full image of the target color space by combining the residual image with the temporary image.

In operation 207, the color space converting apparatus may obtain and output a target mosaic pattern image of the target color space by performing downsampling on the target full image.

Figure 3:
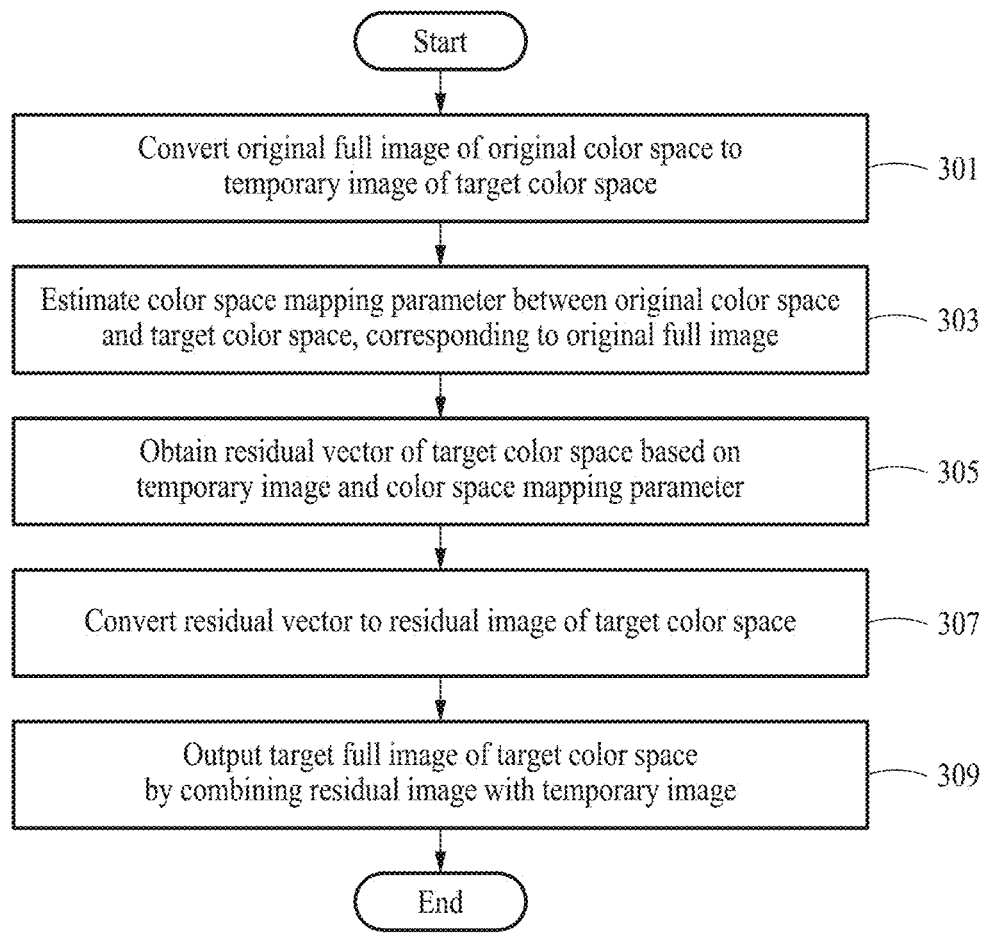
FIG. 3 is a flowchart illustrating operations of a color space converting method of a full image level according to an example embodiment.

FIG. 3 is a flowchart illustrating operations of a color space converting method of a full image level according to an example embodiment.

Referring to FIG. 3, operations of a color space converting method (e.g., operation 205 of FIG. 2) for converting an original full image to a target full image are disclosed. A color space converting apparatus may output a target full image of a target color space based on a residual image and a color space mapping parameter between an original color space and the target color space, the color space mapping parameter corresponding to an original full image.

In operation 301, the color space converting apparatus may convert the original full image of the original color space to a temporary image of the target color space. The color space converting apparatus may convert the original full image to the temporary image using one or more pre layers of a neural network.

In operation 303, the color space converting apparatus may estimate the color space mapping parameter between the original color space and the target color space, corresponding to the original full image. The color space converting apparatus may estimate the color space mapping parameter from the original full image using one or more attention layers of the neural network.

In operation 305, the color space converting apparatus may obtain a residual vector of the target color space based on the temporary image and the color space mapping parameter. The color space converting apparatus may obtain the residual vector based on the temporary image and the color space mapping parameter using two or more main layers of the neural network.

The color space converting apparatus may convert the temporary image to a first vector using a first main layer of a neural network. The color space converting apparatus may output a second vector based on the first vector and the color space mapping parameter. The color space converting apparatus may convert the second vector to a third vector using a second main layer of the neural network. The color space converting apparatus may output the residual vector based on the third vector and the color space mapping parameter.

In addition, the color space converting apparatus may output a fourth vector based on the third vector and the color space mapping parameter. The color space converting apparatus may convert the fourth vector to the residual vector using a third main layer of the neural network. The number of main layers is exemplary, and two or more main layers may be used.

In operation 307, the color space converting apparatus may convert the residual vector to the residual image of the target color space. The color space converting apparatus may convert the residual vector to the residual image using a post layer of the neural network.

In operation 309, the color space converting apparatus may obtain and output a target full image of the target color space by combining the residual image with the temporary image.

The neural network including the one or more pre layers, the one or more attention layers, the two or more main layers, and the post layer may be trained in advance based on training data.

Figure 4:
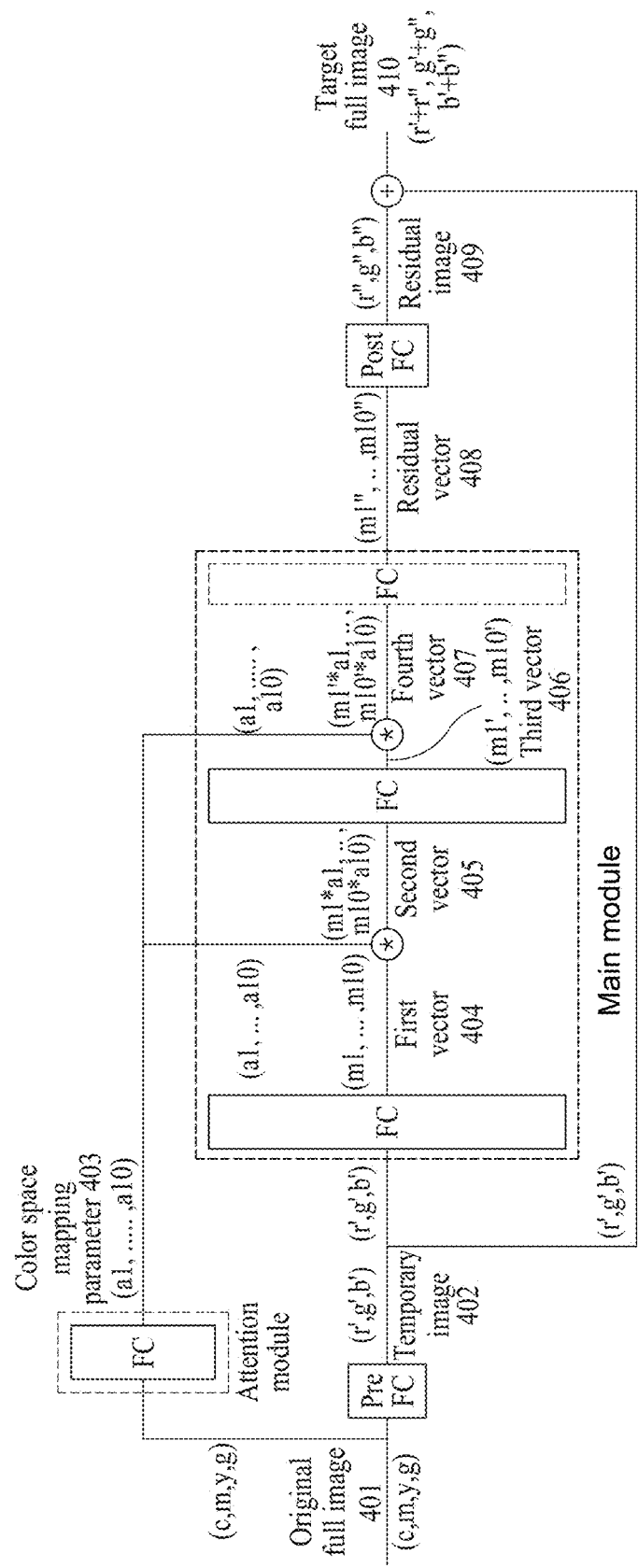
FIG. 4 illustrates an example of a structure of a neural network that performs a color space converting method of a full image level according to an example embodiment.

FIG. 4 illustrates an example of a structure of a neural network that performs a color space converting method of a full image level (i.e., from an original full image to a target full image) according to an example embodiment.

Referring to FIG. 4, an example of a structure of a neural network that performs a color space converting method (e.g., operation 205 of FIG. 2) of a full image level is shown. The neural network may include a pre module Pre FC, an attention module, a main module, a post module, and a residual connection. The pre module may include one or more pre layers. The attention module may include one or more attention layers. The main module may include two or more main layers. The post module may include one or more post layers. Each layer may be a fully-connected layer (FC). The dimensions of vectors described hereinafter are examples and the disclosure is not limited thereto.

First, an original full image 401 input to the neural network is an image of a CMYG color space. One pixel of the original full image 401 may have a four-dimensional vector (c, m, y, g) of the CMYG color space.

The pre module may perform rough color space conversion. The original full image 401 may be input to the one or more pre layers of the pre module. The one or more pre layers may output a temporary image 402. The temporary image 402 may have a three-dimensional vector (r', g', b') of an RGB color space. The temporary image 402 is a rough image that needs to be adjusted through a residual image 409.

The original full image 401 may be input to the one or more attention layers of the attention module, such that a color space mapping parameter 403 may be output. The color space mapping parameter 403 may be a ten-dimensional vector (a1, . . . , a10). The one or more attention modules may output the color space mapping parameter 403 for adjusting a coefficient of a 4th order polynomial function for each region of a color space.

The temporary image 402 may pass through the two or more main layers of the main module. The main module may output the sophisticated residual image 409 to adjust the temporary image 402. In FIG. 4, for description, it is assumed that the main module includes three main layers. The main layers may correspond to a 4th order polynomial function.

The temporary image 402 may be input to the first main layer, and a first vector 404 may be output. The first vector 404 may be a ten-dimensional vector (m1, . . . , m10).

By combining the first vector 404 with the color space mapping parameter 403, a second vector 405 may be output. For example, the second vector 405 may be output based on a vector product of the first vector 404 and the color space mapping parameter 403. The second vector 405 may be a ten-dimensional vector (m1*a1, . . . , m10*a10).

The second vector 405 may be input to the second main layer, and a third vector 406 may be output. The third vector 406 may be a ten-dimensional vector (m1', . . . , m10').

By combining the third vector 406 with the color space mapping parameter 403, a fourth vector 407 may be output. For example, the fourth vector 407 may be output based on a vector product of the third vector 406 and the color space mapping parameter 403. The fourth vector 407 may be a ten-dimensional vector (m1'*a1, . . . , m10'*a10).

The fourth vector 407 may be input to the third main layer, and a residual vector 408 may be output. The residual vector 408 may be a ten-dimensional vector (m1", . . . , m10").

The residual vector 408 may be input to the one or more post layers of the post module, and the residual image 409 may be output. The post module may convert the dimension of the residual vector 408 to the dimension of the RGB color space. The residual image 409 may be a three-dimensional vector (r", g", b").

The residual image 409 may be combined with the temporary image 402 by the residual connection, and a target full image 410 may be output. The target full image 410 may be obtained and output by an addition between the residual image 409 and the temporary image 402. The target full image 410 may be a three-dimensional vector (r'+r", g'+g", b'+b").

Figure 5A:
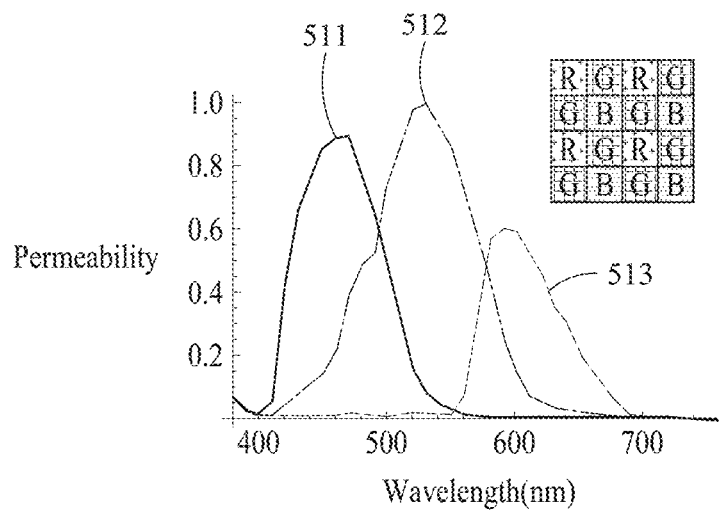
FIGS. 5A to 5C illustrate wavelength-based permeabilities of a CMYG color space and an RGB color space and a mapping relationship therebetween.
Figure 5B:
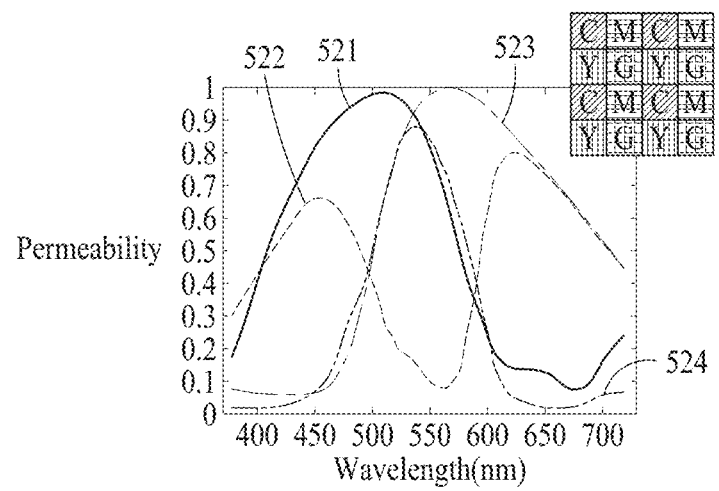
Figure 5C:
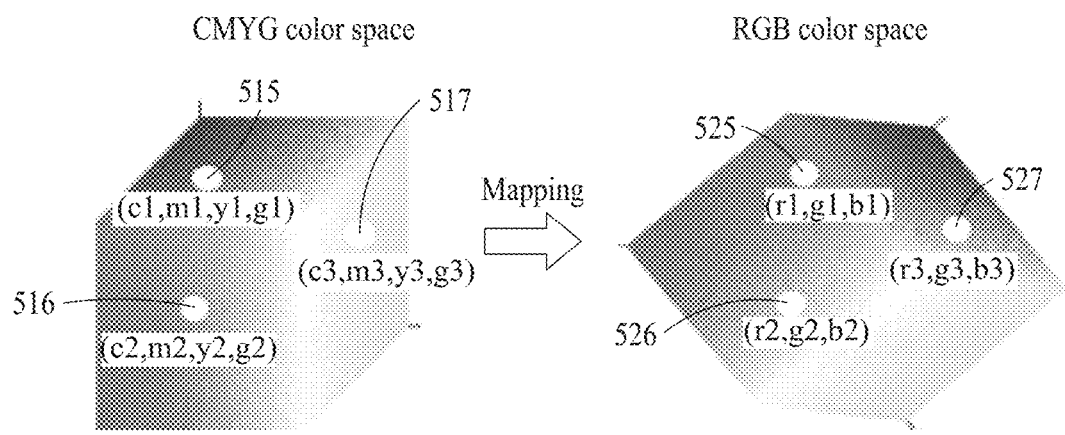

FIGS. 5A to 5C illustrate wavelength-based permeabilities of a CMYG color space and an RGB color space and a mapping relationship therebetween.

Referring to FIG. 5A, the permeability according to the wavelength for each color of an RGB color space is shown. Graph 511 represents the permeability of blue light, Graph 512 represents the permeability of green light, and Graph 513 represents the permeability of red light.

Referring to FIG. 5B, the permeability according to the wavelength for each color of a CMYG color space is shown. Graph 521 represents the permeability of cyan light, Graph 522 represents the permeability of magenta light, Graph 523 represents the permeability of yellow light, and Graph 524 represents the permeability of green light.

Comparing FIGS. 5A and 5B, the permeability for all the wavelengths of the CMYG color space is higher than the permeability for all the wavelengths of the RGB color space. As described above, since the colors of the CMYG color space are in a complementary color relationship, a color filter array of the CMYG color space may receive about two times more light throughout all the wavelengths than a color filter array of the RGB color space. An image sensor to which the color filter array of the CMYG color space is applied may be robust against noise.

Referring to FIG. 5C, the mapping relationship between the CMYG color space and the RGB color space is shown. A point 515 (c1, m1, y1, g1) in the CMYG color space corresponds to a point 525 (r1, g1, b1) in the RGB color space. A point 516 (c2, m2, y2, g2) in the CMYG color space corresponds to a point 526 (r2, g2, b2) in the RGB color space. A point 517 (c3, m3, y3, g3) in the CMYG color space corresponds to a point 527 (r3, g3, b3) in the RGB color space. Each mapping relationship between the points is nonlinear and may be derived through attention layers of a neural network.

Figure 6:
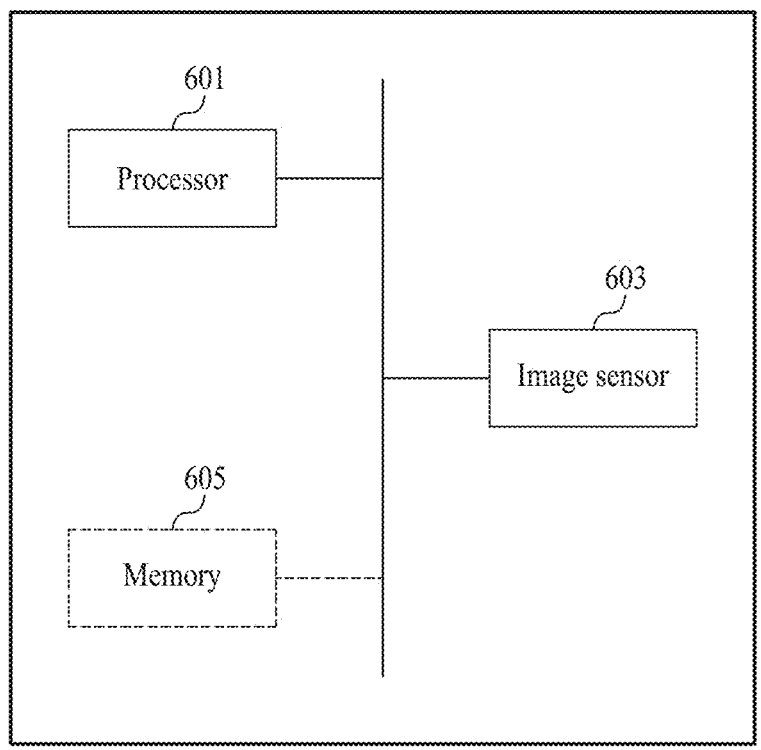
FIG. 6 is a block diagram illustrating a configuration of a terminal that performs a color space converting method according to an example embodiment.

FIG. 6 is a block diagram illustrating a configuration of a terminal that performs a color space converting method according to an example embodiment.

Referring to FIG. 6, a terminal 600 includes at least one processor 601 and an image sensor 603. The terminal 600 may further include a memory 605 storing instructions that are executable by the at least one processor 701. The image sensor 603 may output an original mosaic pattern image of an original color space. Here, the original color space may include a CMYG color space, and the original mosaic pattern image may include a CMYG Bayer pattern image.

The processor 601 may obtain a preprocessed mosaic pattern image by performing image signal preprocessing on the original mosaic pattern image. The processor 601 may obtain an original full image of the original color space by demosaicing the preprocessed mosaic pattern image. The processor 601 may obtain and output a target full image of a target color space based on a residual image and a color space mapping parameter between an original color space and the target color space, the color space mapping parameter corresponding to an original full image. The processor 601 may obtain and output a target mosaic pattern image of the target color space by performing downsampling on the target full image.

Figure 7:
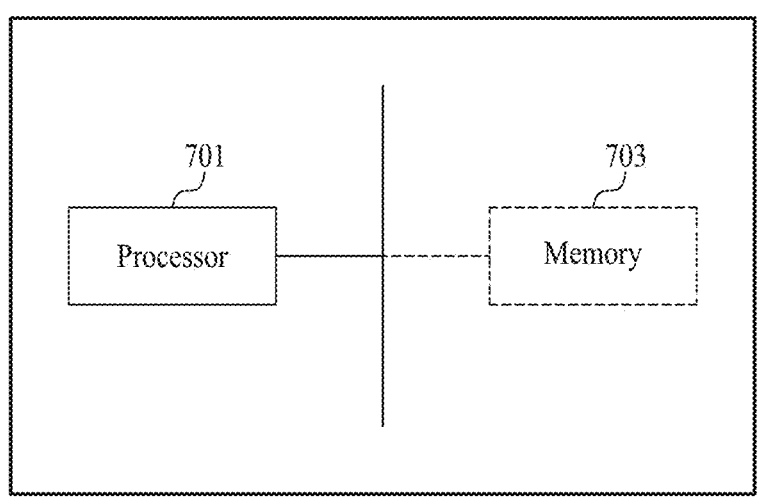
FIG. 7 is a block diagram illustrating a configuration of a color space converting apparatus according to an example embodiment.

FIG. 7 is a block diagram illustrating a configuration of a color space converting apparatus according to an example embodiment.

Referring to FIG. 7, a color space converting apparatus 700 includes at least one processor 701. The color space converting apparatus 700 may further include a memory 703 storing instructions that are executable by the at least one processor 701.

The processor 701 may convert an original full image of an original color space to a temporary image of a target color space. The processor 701 may estimate a color space mapping parameter between the original color space and the target color space, the color space mapping parameter corresponding to the original full image. The processor 701 may obtain a residual vector of the target color space based on the temporary image and the color space mapping parameter. The processor 701 may convert the residual vector to a residual image of the target color space. The processor 701 may obtain and output a target full image of the target color space by combining the residual image with the temporary image.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of converting a color space, the method comprising:
converting an original full image of an original color space to a temporary image of a target color space;
estimating a color space mapping parameter between the original color space and the target color space, the color space mapping parameter corresponding to the original full image;
obtaining a residual vector of the target color space based on the temporary image and the color space mapping parameter;
converting the residual vector to a residual image of the target color space; and
obtaining a target full image of the target color space by combining the residual image with the temporary image.

2. The method of claim 1, wherein the obtaining the residual vector comprises:
converting the temporary image to a first vector using a first main layer of a neural network;
obtaining a second vector based on the first vector and the color space mapping parameter;
converting the second vector to a third vector using a second main layer of the neural network; and
obtaining the residual vector based on the third vector and the color space mapping parameter.

3. The method of claim 2, wherein the obtaining the residual vector based on the third vector and the color space mapping parameter comprises:
obtaining a fourth vector based on the third vector and the color space mapping parameter; and
converting the fourth vector to the residual vector using a third main layer of the neural network.

4. The method of claim 1, wherein the original color space is a cyan, magenta, yellow, and green (CMYG) color space, and the target color space comprises a red, green, and blue (RGB) color space.

5. The method of claim 1, wherein the converting the original full image to the temporary image comprises converting the original full image to the temporary image using at least one pre layer of a neural network,
wherein the estimating o the color space mapping parameter comprises estimating the color space mapping parameter from the original full image using at least one attention layer of the neural network,
wherein the obtaining the residual vector comprises obtaining the residual vector based on the temporary image and the color space mapping parameter using at least two main layers of the neural network,
wherein the converting to the residual image comprises converting the residual vector to the residual image using a post layer of the neural network, and
wherein the at least one pre layer, the at least one attention layer, the at least two main layers, and the post layer are trained based on training data.

6. A method of converting a color space, the method comprising:
obtaining a preprocessed mosaic pattern image by performing image signal preprocessing on an original mosaic pattern image of an original color space;
obtaining an original full image of the original color space by demosaicing the preprocessed mosaic pattern image;
obtaining a target full image of a target color space based on a residual image and a color space mapping parameter between the original color space and the target color space, the color space mapping parameter corresponding to the original full image; and
obtaining a target mosaic pattern image of the target color space by performing downsampling on the target full image,
wherein the residual image is obtained based on a temporary image of the target color space.

7. The method of claim 6, wherein the obtaining the target full image comprises:
converting the original full image of the original color space to the temporary image of the target color space;
estimating the color space mapping parameter between the original color space and the target color space;
obtaining a residual vector of the target color space based on the temporary image and the color space mapping parameter;
converting the residual vector to the residual image of the target color space; and
obtaining the target full image of the target color space by combining the residual image with the temporary image.

8. The method of claim 7, wherein the obtaining the residual vector comprises:
converting the temporary image to a first vector using a first main layer of a neural network;
obtaining a second vector based on the first vector and the color space mapping parameter;
converting the second vector to a third vector using a second main layer of the neural network; and
obtaining the residual vector based on the third vector and the color space mapping parameter.

9. The method of claim 8, wherein the obtaining the residual vector based on the third vector and the color space mapping parameter comprises:
obtaining a fourth vector based on the third vector and the color space mapping parameter; and
converting the fourth vector to the residual vector using a third main layer of the neural network.

10. The method of claim 6, wherein the original color space comprises a cyan, magenta, yellow, and green (CMYG)color space, and the target color space comprises a red, green, and blue (RGB) color space.

11. The method of claim 7, wherein the converting the original full image to the temporary image comprises converting the original full image to the temporary image using at least one pre layer of a neural network,
wherein the estimating of the color space mapping parameter comprises estimating the color space mapping parameter from the original full image using at least one attention layer of the neural network,
wherein the obtaining of the residual vector comprises obtaining the residual vector based on the temporary image and the color space mapping parameter using at least two main layers of the neural network,
wherein the converting to the residual image comprises converting the residual vector to the residual image using a post layer of the neural network, and
wherein the at least one pre layer, the at least one attention layer, the at least two main layers, and the post layer are trained based on training data.

12. A non-transitory computer-readable storage medium storing instructions that, when executed by a processor, cause the processor to perform the method of claim 1.

13. An apparatus for converting a color space, the apparatus comprising:
- a memory storing at least one instruction; and
- at least one processor configured to execute the at least one instruction to:
- convert an original full image of an original color space to a temporary image of a target color space,
- estimate a color space mapping parameter between the original color space and the target color space, the color space mapping parameter corresponding to the original full image,
- obtain a residual vector of the target color space based on the temporary image and the color space mapping parameter,
- convert the residual vector to a residual image of the target color space, and
- obtain a target full image of the target color space by combining the residual image with the temporary image.

14. A terminal comprising:
- at least one processor; and
- an image sensor configured to output an original mosaic pattern image of an original color space,
- wherein the at least one processor is configured to:
- obtain a preprocessed mosaic pattern image by performing image signal preprocessing on the original mosaic pattern image output by the image sensor,
- obtain an original full image of the original color space by demosaicing the preprocessed mosaic pattern image,
- obtain a target full image of a target color space based on a residual image and based on a color space mapping parameter between the original color space and the target color space, the color space mapping parameter corresponding to the original full image, and
- obtain a target mosaic pattern image of the target color space by performing downsampling on the target full image,
- wherein the residual image is obtained based on a temporary image of the target color space.

* * * * *